US006152279A

United States Patent [19]

Davis

[11] Patent Number: 6,152,279

[45] Date of Patent: Nov. 28, 2000

[54] STRIP BARRIER BRUSH ASSEMBLY

[75] Inventor: Chris M. Davis, Midlothian, Va.

[73] Assignee: Jason Incorporated, Cleveland, Ohio

[21] Appl. No.: 09/266,986

[22] Filed: Mar. 12, 1999

Related U.S. Application Data

[60] Provisional application No. 60/079,175, Mar. 23, 1998.

[51] Int. Cl.[7] ..................... B65G 45/18

[52] U.S. Cl. ..................... 198/333; 198/323

[58] Field of Search ..................... 198/323, 326, 198/333

[56] References Cited

U.S. PATENT DOCUMENTS

| | | | |
|---|---|---|---|
| 2,193,583 | 3/1940 | Dunlop . | |
| 2,846,045 | 8/1958 | Flower . | |
| 3,616,891 | 11/1971 | Earle . | |
| 3,986,595 | 10/1976 | Asano et al. | 198/333 |
| 4,397,383 | 8/1983 | James | 198/333 |
| 4,519,490 | 5/1985 | White | 198/333 |
| 4,629,052 | 12/1986 | Kitamura | 198/323 |
| 4,669,597 | 6/1987 | Langer et al. | 198/323 |
| 5,042,641 | 8/1991 | Soldat | 198/496 |
| 5,082,102 | 1/1992 | Reichmuth | 198/333 |
| 5,242,042 | 9/1993 | Mauldin | 198/333 |
| 5,810,147 | 9/1998 | Vanmoor | 198/323 |

FOREIGN PATENT DOCUMENTS

| | | |
|---|---|---|
| 2123092 | 5/1990 | Japan . |
| 3158387 | 7/1991 | Japan . |
| 4028692 | 1/1992 | Japan . |
| 2069438 | 8/1981 | United Kingdom . |

OTHER PUBLICATIONS

Sealeze 1988 Catalog (1987)—see p. 8.

Article: The Washington Post Sep. 9, 1994—see p. B3.

*Primary Examiner*—Janice L. Krizek
*Attorney, Agent, or Firm*—Renner, Otto, Boisselle & Sklar, LLP

[57] ABSTRACT

A safety barrier is provided for transports such as moving walks or stairs (escalators) which have a moving surface and fixed sidewalls. The barrier is a strip barrier brush assembly adapted to be attached to the sidewall and includes at least one brush strip adapted to project over the edge of the moving surface. The assembly includes a rail housing having a channel slot extending parallel to the direction of movement of the surface. The rail housing includes a hollow upper or lower portion including a rearward surface and a spaced outer surface. A through hole is formed through such surfaces by a smaller opening in the rearward surface and a larger opening in the spaced outer surface so that the rearward surface forms a fastener retention surface with access there to being obtained through the larger opening. The larger opening may be closed by a flush through hole cap.

9 Claims, 2 Drawing Sheets

STRIP BARRIER BRUSH ASSEMBLY

This application is a continuation of a Provisional Application Ser. No. 60/079,175, filed Mar. 23, 1998.

BACKGROUND OF THE INVENTION

The proposed Strip Barrier Brush Assembly is an aesthetically pleasing and functionally effective solution to prevent the accidental entrapment of an individual's extremities and/or entanglement of their property in a moving stairway or moving walkway. Modern moving stairways and walkways pose a potential pinch point hazard to persons being transported along the interfacing surfaces of the sidewalls and the moving surface of the transporter. To accommodate the subtle alignment variation between the fixed sidewalls and the moving surface of the transporter, a minimal clearance space is provided. This potential hazard can be diminished with a barrier which gently induce riders to stay away from pinch points that could cause the inadvertent entrapment of an individual's extremities and/or entanglement of their property in a moving stairway or moving walkway. Several rail design variations have been disclosed in U.S. Pat. Nos. D 283,444 and D 283,445. These rail designs are very limited and fail to comprehend the operational needs to install and maintain.

SUMMARY OF THE INVENTION

A brush strip safety barrier assembly for moving stair or walks uses a rail housing which includes at least one lower angled channel slot for receiving brush strip of the type having a folded and crimped backbone holding the filaments folded about a core. The channel slot includes lips which overlap the edges of the backbone when the strip is inserted. The rail housing includes an upper or lower hollow portion which includes front and rear surfaces. Through Holes are formed along the rail so that fasteners may be used on the rear surface with access being obtained through the front surface. The fastener will be secured to the back of the rear surface in a manner that can allow for the removal of the fasteners. This will allow for ease of removal and maintenance. A flush cap normally closes the Through Hole in the outer surface. The Through Hole can also be configured to allow for a flush mounted or countersunk fastener. This fastener can be vandal resistant or standard. The top and bottom surfaces are symmetrically tapered. The assembly is effective and easy to maintain and attach or replace.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

The strip Barrier Brush Assembly (FIG. 1) is designed to diminish the probability of entrapment and/or entanglement in a moving stairway or moving walkway. The Strip Barrier Brush Assembly combines a brush element (FIG. 2) with a custom brush retention/mounting rail (FIGS. 3 and 4). The Strip Barrier Brush Assembly's cross-sectional view (FIG. 1) depicts the combined brush element and the custom brush retention/mounting rail.

Figure 1:
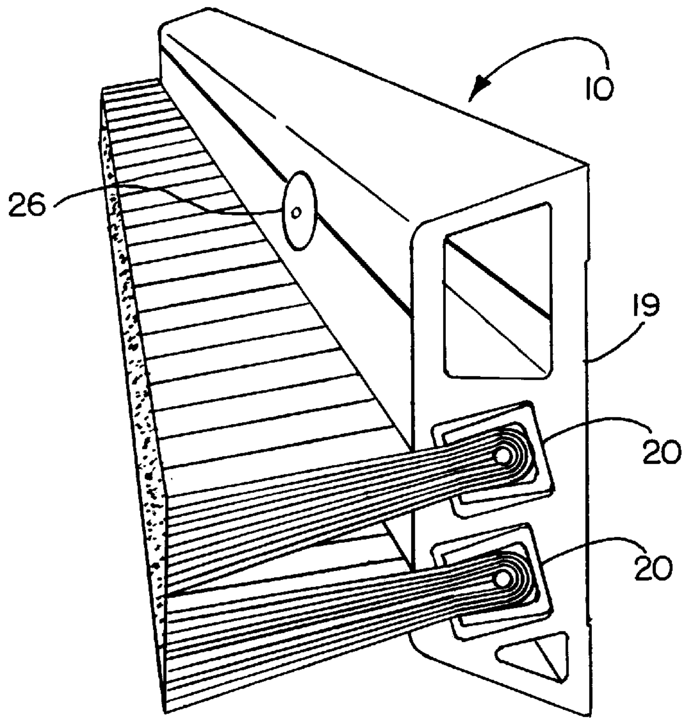
FIG. 1 is a cross-sectional perspective view of the strip barrier brush assembly with the brush strips in place.

The Strip Barrier Brush Assembly 10 shown in FIG. 1, which in the preferred embodiment, comprises a Rail Housing 19, a Brush Assembly 20, and a Through Hole Cap 26. The Brush Assembly 20 shown in FIG. 2, which in the preferred embodiment, reveals a Core Wire 21, a Flat Backbone 22, Random Length Filaments 23, Trimmed Filaments 24, and a Folded Backbone 25, which is the same element as 22, but folded and crimped. The device being described in this application involves the use of several elements which are duplicated within the Rail Housing 19 of the invention. For the purpose of explanation, these duplicate elements will be identified with a descriptive title and a corresponding reference numeral.

FIGS. 3 and 4, respectively, depict the perspective and end views of the Rail Housing 19. These Figures show the Backbone Retention Cavity 11/11', the Upper Retainer Edge 12/12', the Lower Retainer Edge 13/13', the Brush Passage Slot 14/14', the Tapered Top Surface 15, the Tapered Bottom Surface 16, a Fastener Retention Surface 17, a Fastener Through Hole 18, a Major Diameter 27, a Minor Diameter 28, a Cap Recess 29, an Insert Nut or Fastener Recess 30, and an optional Through Hole Cap 26.

Figure 2:
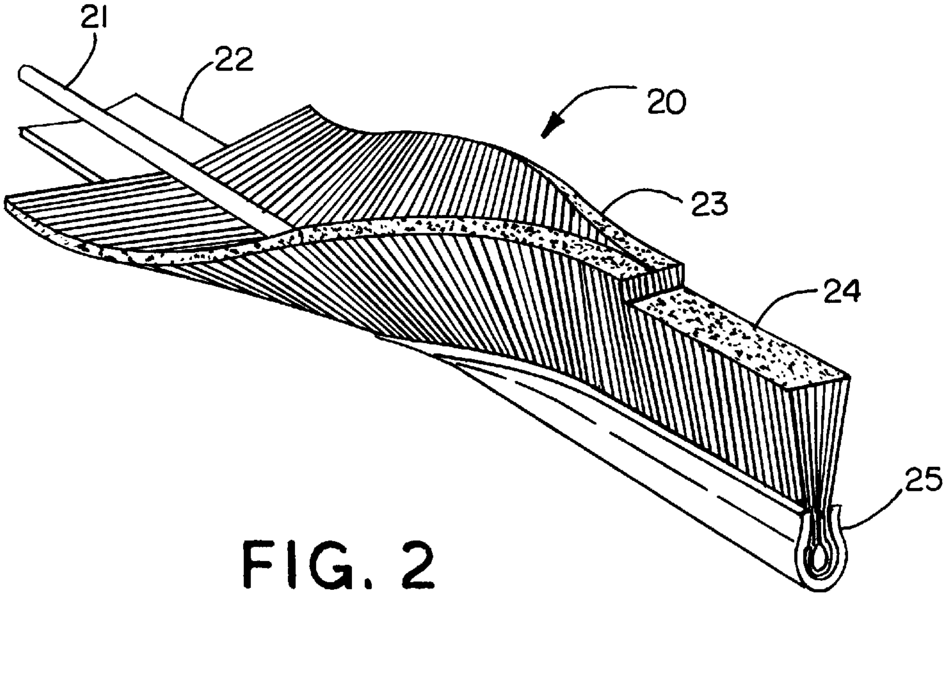
FIG. 2 is a perspective view of the brush strip being made.
Figure 3:
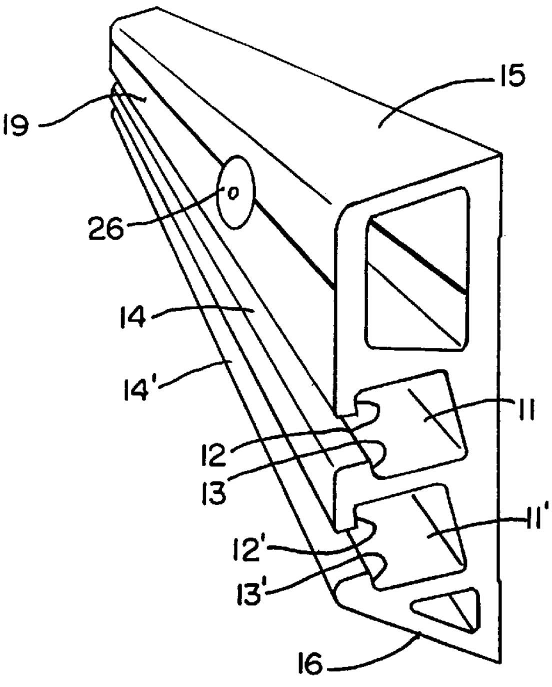
FIG. 3 is a perspective view of the rail housing without the brush strips.
Figure 4:
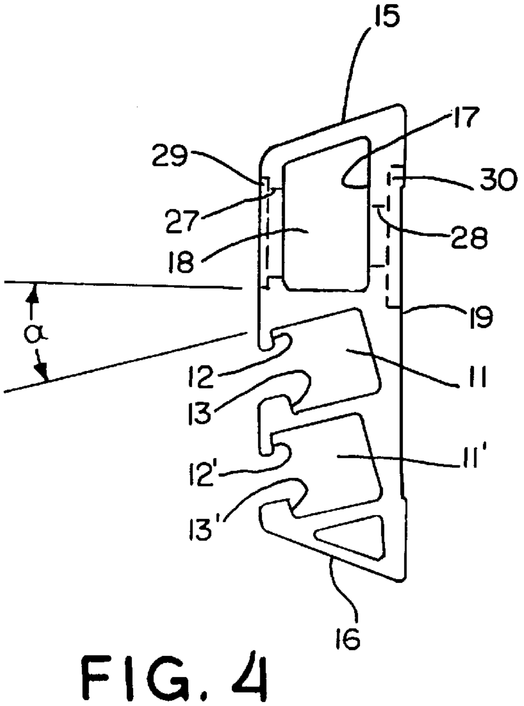
FIG. 4 is an end elevation of the rail housing.

Specifically, FIG. 1 shows the Brush Assembly 20 of FIG. 2 inserted into the Rail Housing 19, the latter being shown in FIGS. 3 and 4. The Brush Assembly 20 is formed folding Random Length Filaments 23 between a Flat Backbone 22 and a Core Wire 21. The crimping action of the Folded Backbone 25 mechanically holds the Random Length Filaments 23 about the Core Wire 21. The Brush Assembly 20 is completed when the Random Length Filaments 23 are cut to form the final product with Trimmed Filaments 24. Cutting the filaments provides a uniform face to the device, allows all of the filaments to act as one in their resistance to compression, and increases the filament tip surface area. This attribute enhances the barrier capability of the Strip Barrier Brush Assembly 10.

The sliding insertion of the Brush Assembly 20 into the Backbone Retention Cavity 11/11' permits the Folded Backbone 25 to be guided and retained by the respective Upper Retainer Edge 12/12' and Lower Retainer Edge 13/13' of the rail Housing 19. The extended Trimmed Filaments 24 of the Brush Assembly 20 protrude through the Brush Passage Slot 14/14'. In the preferred embodiment, but not limited to, the top extent of the Trimmed Filaments 24 of the Brush Assembly 20 and the lower edge of Angle a are substantially coincident.

The angular mounting of the Brush Assembly 20 in the Rail Housing 19 helps deflect the individual's extremities and/or property from possible entrapment. The color of the Trimmed Filaments 24 of the Brush Assembly 20 in the Strip Barrier Brush Assembly 10 can be either the same color to provide a discrete barrier in upscale applications or different colors to highlight the barrier surface for potential high incident applications.

The Strip Barrier Brush Assembly 10 in normal use is affixed to the vertical side walls of the moving walkway. In the preferred embodiment, but not limited to, the Strip Barrier Brush Assembly 10 is fastened to vertical or angled side walls. At convenient intervals, a hole is cut through the upper surface of the Rail Housing 19 to provide a Fastener Hole 18 with a Major Diameter 27 and a Minor Diameter 28. The Fastener Retention Surface 17 of the Minor Diameter 28 of the rearward surface provides a means to rigidly affix using a shouldered fastener to the vertical wall of the moving stairway or moving walkway. The Insert Nut or Fastener Recess 30, in the preferred embodiment, accommodates the protruding shoulder of a commercial anchor nut assembly (not shown) which offers an enhanced attachment means to the vertical side walls. The Insert Nut or Fastener Recess 30 facilitates the secure, flush mounting of the Strip Barrier Brush Assembly 10 to the vertical or angled side walls of the moving stairway or moving walkway. A Cap Recess 29 is cut into the outer surface of the Rail Housing 19 to provide a means to effectively attach the Through Hole Cap 26. The Through Hole Cap 26 is seated in the Cap Recess 29 and is retained by gripping the edge of the Major Diameter 27 of Through Hole in the outer surface.

Figure 5:
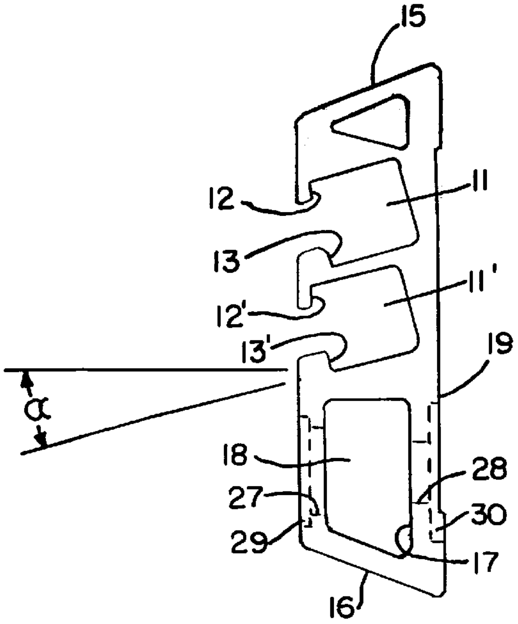
FIG. 5 is an end elevation like FIG. 4 but showing the hollow upper portion on the bottom.

As indicated by FIG. 5, the brush strip retaining slots may be in the upper portion of the Rail Housing, and the hollow portion with the Fastener Through Holes may be in the lower portion. The top and bottom surfaces, as in the FIG. 4 embodiment, are tapered and symmetrical for bidirectional application of a common end cover.

The tapered Top Surface 15 of the rail housing is designed to deflect or block direct access to the entrapment point. The Tapered Bottom Surface 16 is designed to deflect objects away from the top surface of the moving stairway or moving walkway and the Strip Barrier Brush Assembly 10. The exposed Trimmed Filaments 24 of the Strip Barrier Brush Assembly 10 provide a flexible barrier which adapts to the escalating/descending moving stairway elements or the variations in surface flatness of the moving walkway. The symmetry of the Tapered Top Surface 15 and the Tapered Bottom Surface 16 permits the bidirectional application of a common end cover.

To the accomplishment of the foregoing and related ends, the invention then comprises the features particularly pointed out in the claims, these being indicative, however, of but a few of the various ways in which the principles of the invention may be employed.

What is claimed is:

1. A safety barrier for transports such as moving walks or stairs having a moving surface and fixed sidewalls, comprising a strip barrier brush assembly adapted to be attached to the sidewall and including at least one brush strip adapted to project beyond a lateral edge of the moving surface, said assembly including a rail housing adapted to be secured to a sidewall, said rail housing having at least one channel slot extending parallel to the direction of movement of the surface, and an upper or lower hollow portion including a rearward surface and a spaced outer surface, a through hole through said surfaces, said through hole being formed by a smaller opening in said rearward surface and a larger opening in said spaced outer surface so that said rearward surface forms a fastener retention surface with access thereto through said larger opening.

2. A safety barrier as set forth in claim 1 including two parallel channel slots in said rail housing, and a second brush strip inserted in the second channel slot to extend and project parallel to the first.

3. A safety barrier as set forth in claim 2 wherein each brush strip has its axis of symmetry projecting outwardly and downwardly from said rail housing.

4. A safety barrier as set forth in claim 3 wherein each brush strip includes a trimmed face coplanar with each other and substantially normal to the moving surface.

5. A safety barrier as set forth in claim 3 wherein the faces of each brush strip are substantially contiguous to each other.

6. A safety barrier as set forth in claim 1 wherein said channel slot includes upper and lower retaining edges directed toward each other narrowing the slot opening, and a brush strip inserted in said channel slot and including brush filaments folded around a core and held in place by a crimped folded backbone, said retaining edges overlapping the edges of said backbone to hold the brush strip in place.

7. A safety barrier as set forth in claim 1 wherein said rail housing includes symmetrical tapered top and bottom surfaces to enable the bidirectional application of a common end cover.

8. A safety barrier as set forth in claim 1 including a flush through hole cap seated in a cap recess operative to close the hole in the outer surface.

9. A safety barrier as set forth in claim 8 including an insert recess in said rearward surface facing the fixed sidewall to accommodate a fastening assembly.

* * * * *